Patented Feb. 3, 1925.

1,524,664

UNITED STATES PATENT OFFICE.

DONALD M. LIDDELL, OF ELIZABETH, NEW JERSEY.

BUILDING MATERIAL AND PROCESS OF MANUFACTURING SAME.

No Drawing.      Application filed March 24, 1923. Serial No. 627,306.

*To all whom it may concern:*

Be it known that I, DONALD M. LIDDELL, a citizen of the United States, residing at Elizabeth, New Jersey, have invented a certain new and useful Improvement in Building Materials and Processes of Manufacturing Same, of which the following is a clear, full, and exact description.

This invention relates to a building material usable for stucco and the like, and a process of manufacturing same.

Magnesite ($MgCO_3$) when burned produces an impure magnesium oxide usually known as calcined magnesite, plastic magnesia cement, etc. As is well known, when burned magnesite and a solution of magnesium chloride are brought together, a chemical reaction occurs with the ultimate formation of an insoluble magnesium oxychloride. A mixture of burned magnesite, asbestos and sand, with or without other ingredients such as ground silica, coloring matters, etc., set with a magnesium chloride solution, has been used as a flooring material and also as a stucco.

In the marketing of calcined magnesite stucco, it is the practice of the makers to ship a powdered or finely divided mass containing the burned magnesite and the other insoluble ingredients, and, separately, a solution of magnesium chloride, or else to ship the first-named materials mixed and the magnesium chloride in solid form but unmixed, the building contractor making up solutions from the solid chloride and then making the mixture with the insoluble solids. Obviously, either method is objectionable. If the chloride is shipped as a liquid, it means that freight must be paid on the contained water and on the drums, and that the latter must be returned. In addition, there is always a certain amount of breakage or leakage. It also often occurs that the workmen, either through ignorance or in attempting to cheapen the job, will dilute the chloride solution below its proper strength, so that the stucco prepared will be inferior in tensile strength and in weather-resisting power, to the general damage of the industry. Even if the magnesium chloride is shipped as a solid, it must be in tight barrels or drums for otherwise it absorbs moisture from the air, and consequently there is always the danger that workmen will make up solutions of incorrect strength. Attempts have been made to grind or mix the chloride with the dry stucco mix (usually consisting of burned magnesite, asbestos, sand, and powdered silica) and to ship the resulting mass. If such a material is kept in a moisture-proof container or used within a very short time after its preparation, the resulting stucco is successful, but if the mass, even in bags or ordinary barrels, is allowed to come into contact with the air, it absorbs moisture from the atmosphere and sets so that it is thereafter unfit to use as stucco. Even if air has no access to it, often there is enough moisture present in some of the apparently dry constituents, for example, the sand, to cause the powder to take a partial set and thus have an inferior tensile strength and weather-resisting power when applied to the building.

My object is to avoid the above disadvantages and to produce a building material, for example, a stucco, which can be shipped in a ready-mixed and dry condition and containing the proper amounts of solid ingredients, which will not absorb an amount of atmospheric moisture sufficient to cause the same to set, and which only needs the addition of water in bulk to result in a mix which is necessarily of the proper proportions to give the desired results. Preferably also the material results in a water-proofed product, after its application as a stucco. Although the process of producing the result may be carried out in various ways without departing from the spirit of my invention as claimed, I have found, for example, that if magnesium chloride containing water,—e. g. all or a part of the water of crystallization,—and magnesium oxide, in their solid and commercially dry form, are ground together with a colloidal substance such as some of the fats, oils and greases, or if the burned magnesite and magnesium chloride are intimately mixed with a finely powdered or liquid colloid, the tendency to absorb atmospheric moisture and so set is greatly lessened, and with some colloids it seems to be entirely avoided. In general, it may be said that while a colloid, (i. e., a substance which when in a dispersion medium will not pass through a permeable membrane, or will pass it only with difficulty) such as powdered starch, decreases the setting tendency, oils, fats and greases are more effective, while the salts of the fatty acids and saponified oils are still more so. Oleates, stearates, arachidates, resinates, tungoleates, linoleates, butyrates and other compounds give good results under some conditions. Palmitates have been found the most effective of the fatty acid salts, and aluminum palmitate seems to be the most effective of them all. The word "palmitate" as here used is not necessarily restricted to the chemically pure salt, but also includes those compounds commercially known as "palmitates" derived from cocoanut, palm and palm kernel oil, and hence usually containing appreciable amounts of other fatty acid radicals. Substantially equivalent results in process and in the final stucco are also obtained by replacing part or all of the magnesium oxide by zinc oxide; or by replacing part or all of the magnesium chloride by zinc chloride, or aluminum chloride, both of which form insoluble oxysalts. Therefore in the claims the words "magnesium oxide" and "magnesium chloride" are intended to include such equivalents.

The mixture of burned magnesite and magnesium chloride may be stabilized against atmospheric moisture in various other ways than by grinding together with the colloid. In winter it seems preferable to grind the calcined magnesite, chloride and water-proofing together and then to add the silex, sand, etc., as this apparently gives a product setting rather faster than the ordinary stucco does in cold weather, which is in itself an advantage. Nevertheless, the calcined magnesite and chloride may be ground together and the mixture stabilized against atmospheric moisture by addition and intimate mixture of the colloid after the grinding operation; but this method is not so good, for the unstabilized mixture may be spoiled during the manufacturing operation by allowing access of air to it. Or the magnesite may be ground with the colloid stabilizing agent, of which the best, as said, is a palmitate, and finely pulverized or granulated magnesium chloride added afterward with simultaneous or still later addition of sand and other fillers. Or the chloride alone may be ground with the waterproofing, or pulverized, granulated or flake chloride may be intimately mixed with the waterproofing agent with only an incidental and almost negligible grinding action and the calcined magnesite and other ingredients thereafter mixed in, and indeed this seems to be the best method of performing the operation in hot weather, since in summer practically all stuccos set much faster than in winter, and often too quickly, and this last method lengthens the period of setting. Or all the ingredients may be mixed simultaneously.

Whichever method (either grinding or mixing) is carried out results, if properly done, in what is believed to be a protective coating over the individual particles of the chloride and burned magnesite. At any rate, it produces a mix in which the undesired setting or solidifying of the material through absorption of atmospheric moisture is substantially prevented. By this I do not mean that if my product is left exposed to atmospheric moisture for an indefinite time it will not set somewhat but, as compared with the untreated material, the setting is extremely slow, for example about one hundredth as fast. The colloid does not prevent water in bulk from acting on the soluble ingredients and forming the proper solution. Consequently, the dry mix can be shipped and the water added at the place of ultimate use, without the disadvantages growing from absorption of atmospheric moisture which made such mixes heretofore proposed and used very objectionable from a commercial standpoint.

While in the foregoing description the chloride and other ingredients are spoken of as "dry", this does not mean "anhydrous", for the chloride, while not sensibly moist, contains water of crystallization, and the sand and other ingredients may contain small percentages of moisture without being sensibly moist to the touch. The heat developed by the grinding operation may drive off some of the water present in some of the ingredients, such, for example, as in the magnesium chloride, and I believe this often occurs under the first method of preparation.

Obviously, the other materials such as powdered silex, sand, fillers, pigments, asbestos, etc., can be added in any order and at any time. That is, the stabilized magnesite magnesium chloride mix may be shipped in its pure form and the sand, etc., not added until it arrives at its place of ultimate use.

As a specific example of my process which I have found successful, I have ground 225 lbs. of solid magnesium chloride, $MgCl_2.6H_2O$, 180 lbs. of burned magnesite and 10 lbs. of aluminum palmitate in a Raymond mill until 80% of the mass will pass through a one-hundred mesh screen. To the 495 lbs. of material thus prepared, I added filler or body material consisting of 80 lbs. of ground silex, 50 lbs. of air float asbestos and 680 lbs. of sand, the entire ingredients being thoroughly mixed. This needs only the addition of water to make it a suitable stucco for applying to houses. The amount of water will ordinarily amount to about 37 gallons, and should be just sufficient to make the mixture flow properly under the trowel. The workmen can hardly go wrong on the water to be added, for if too little is added, the mix will not flow freely enough under the trowel, and if the amount is too great, it will immediately be apparent on inspection.

In summer I have placed together 300 lbs. of commercial flake magnesium chloride and 17 lbs. of waterproofing (aluminum palmitate) in a mixing drum and mixed until the product was uniform to the eye, without any other grinding than that which would take place from the attrition of the chloride and palmitate against each other, and then added 316 lbs. of calcined magnesite, 200 lbs. of silex, 100 lbs. of asbestos, and 1200 lbs. of sand and again mixed until the product was uniform to the eye, but without intentional grinding action, but only the attrition incidental to the mixing.

This application is a continuation in part of my previous application, Serial No. 453,810, filed March 19, 1921.

I am fully aware of the two patents to Turner No. 1,256,847, and Olson No. 1,283,546, but the processes and products as disclosed in these patents have material inherent objections which are not open to those of my invention. As to Turner, he specifies the magnesium chloride as anhydrous. He mentions no other. His mixture is substantially unworkable as a practical matter. There is not enough chloride in it to make a stucco of great enough tensile strength to be commercial. His anhydrous chloride develops such an amount of heat when water is added to it that the mixture sets too quickly, i. e. it takes a box set before it can be used. It is therefore uncommercial for use in large quantities. It is not true of my product. Turner's scratch coat composition cannot be shipped in bags without taking a set, as it readily absorbs water from the air. There are other objections to Turner's disclosure but the above at present seems to be the most important. Olson intimates the waterproofing of an oxychloride of magnesium which is not my process. He also states in substance that metallic soaps are detrimental, which is contrary to the results in my process. Olson also does not specify whether his suggested oxychloride of magnesium is hydrous or non-hydrous.

I am aware that equivalents of some of the ingredients named may be used and also that the process may be carried out in various ways other than those specifically disclosed above without departing from the spirit of my invention as claimed. I therefore do not limit myself to the exact ingredients or steps or proportions above set forth.

What I claim is—

1. A building material in substantially dry form, adapted to set when mixed with water, which comprises magnesium chloride containing water of crystallization and corresponding substantially to the formula $MgCl_2.6H_2O$, and dry magnesium oxide intimately incorporated therewith, together with a protecting agent adapted to prevent lumping of the material on exposure to the atmosphere.

2. A building material in substantially dry form adapted to set when mixed with water, and comprising a dry and finely divided magnesium chloride containing water and a dry magnesium oxide, intimately incorporated with a salt of a fatty acid which is adapted to protect the mixture from material absorption of atmospheric moisture, but not against water in bulk.

3. A building material in substantially dry form adapted to set when mixed with water, and comprising a dry and finely divided magnesium chloride containing water and a dry magnesium oxide, intimately incorporated with an aluminum palmitate which is adapted to protect the mixture from material absorption of atmospheric moisture, but not against water in bulk.

4. The process of producing a building material in substantially dry form adapted to set when mixed with water, which consists in itimately incorporating a dry and finely divided magnesium chloride containing water with a dry magnesium oxide and a protecting agent adapted to prevent lumping by atmospheric moisture.

5. The process of producing a building material in substantially dry form adapted to set when mixed with water, which consists in intimately incorporating a dry and finely divided magnesium chloride containing water with a dry magnesium oxide and a salt of a fatty acid which protects the same from material absorption of atmospheric moisture but not against water in bulk.

6. The process of producing a building material in substantially dry form adapted to set when mixed with water, which consists in intimately incorporating a dry and finely divided magnesium chloride containing water with a dry magnesium oxide and an aluminum palmitate which protects the same from material absorption of atmospheric moisture but not against water in bulk.

7. A building material in substantially dry form adapted to set when mixed with water and comprising dry, finely divided magnesium chloride containing water, dry magnesium oxide, and a dry pulverulent agent, adapted to protect the material from lumping by atmospheric moisture.

Signed at New York, N. Y., this 23rd day of March, 1923.

DONALD M. LIDDELL.